(12) United States Patent
Sanabria et al.

(10) Patent No.: US 7,657,827 B2
(45) Date of Patent: Feb. 2, 2010

(54) CONTROL-SCOPED USER INTERFACE WORKFLOW

(75) Inventors: Andres M. Sanabria, Sammamish, WA (US); Nikhil Kothari, Sammamish, WA (US); Michael J. Harder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 11/223,423

(22) Filed: Sep. 9, 2005

(65) Prior Publication Data

US 2007/0061695 A1      Mar. 15, 2007

(51) Int. Cl.
*G06F 17/21* (2006.01)
(52) U.S. Cl. .................... 715/200; 715/234; 715/273
(58) Field of Classification Search .................. 715/200
See application file for complete search history.

(56) References Cited

U.S. PATENT DOCUMENTS

| | | | |
|---|---|---|---|
| 5,999,911 A * | 12/1999 | Berg et al. ................. 705/9 |
| 7,027,997 B1 * | 4/2006 | Robinson et al. ........... 705/9 |
| 7,069,536 B2 * | 6/2006 | Yaung .................... 717/102 |
| 2006/0149698 A1 * | 7/2006 | Haselden et al. ............ 707/1 |
| 2006/0224702 A1 * | 10/2006 | Schmidt et al. ............. 709/219 |

\* cited by examiner

*Primary Examiner*—Doug Hutton
*Assistant Examiner*—Tionna Smith
(74) *Attorney, Agent, or Firm*—Merchant & Gould; Ryan T. Grace (57) ABSTRACT

A workflow container defines boundaries within which a user interface appears on a page. The workflow container may change what is displayed on the user interface based on a current state of the workflow. Each workflow container maintains an independent association with a workflow that drives the user interface. The workflow is associated with the workflow container at a control level such that multiple workflows may be independently executed on the same page concurrently or separately.

20 Claims, 8 Drawing Sheets

```
                            800
                                            810                    820
<asp:UIFlowContainer runat="server"
  WorkflowName="SendMail" WorkflowTypeName="SampleWebSite.SendMailWorkflow">
  <StartTemplate>
    <asp:ActionButton runat="server" Text="Send an EMail" CausesValidation="false">
      <ClickActions>
        <asp:UIFlowAction Type="StartWorkflow" />
      </ClickActions>
    </asp:ActionButton>
  </StartTemplate>
  <CompleteTemplate>
    <b>Your mail was sent.</b><br />
    <asp:ActionButton runat="server" Text="Send another EMail" CausesValidation="false">
      <ClickActions>
        <asp:UIFlowAction Type="StartWorkflow" />
      </ClickActions>
    </asp:ActionButton>
830 </CompleteTemplate>               840
  <Views>
    <asp:UIFlowView InteractionIdentifier="Compose">
      <ContentTemplate>
        <b>Compose Mail</b>
        <table>
          <tr>
            <td>
              <asp:Label runat="server" Text="To:" AssociatedControlID="toTextBox" />
            </td>
            <td>
              <asp:TextBox runat="server" id="toTextBox" Text='<%# Bind("To") %>' />
            </td>
            <td>
              <asp:RequiredFieldValidator runat="server"
                ValidationGroup="SendMail"
                ControlToValidate="toTextBox" Text="*" />
            </td>
          </tr>
          ...
          <tr>
            <td colspan="3">
              <asp:TextBox runat="server" id="messageTextBox" Text='<%# Bind("Message") %>'
                TextMode="MultiLine" Rows="10" Columns="80" Width="100%" />
              <br />
              <br />
              <asp:CheckBox runat="server" id="specifyOptionsCheckBox"
                Text="Specify additional options"
                Checked='<%# Bind("SpecifyOptions") %>' />
            </td>
          </tr>
          <tr>
            <td colspan="3" align="right">
              <asp:ActionButton runat="server" Text="Submit" CausesValidation="false">
                <ClickActions>
                  <asp:ValidationAction />
                  <asp:UIFlowAction Type="ResumeWorkflow" ResumeAction="Submit" />
                </ClickActions>
              </asp:ActionButton>
              <asp:ActionButton runat="server" Text="Submit" CausesValidation="false">
                <ClickActions>
                  <asp:UIFlowAction Type="CancelWorkflow" />
                </ClickActions>
              </asp:ActionButton>
            </td>
          </tr>
        </table>
      </ContentTemplate>              840
    </asp:UIFlowView>
    <asp:UIFlowView InteractionIdentifier="Options">
      <ContentTemplate>
        ...
      </ContentTemplate>
    </asp:UIFlowView>
  </Views>
</asp:UIFlowContainer>
```

*Fig. 8*

CONTROL-SCOPED USER INTERFACE WORKFLOW

BACKGROUND

A user interface may be driven by a workflow. A workflow is a defined series of tasks that produce a final outcome. The workflow may be defined to prompt a user for input and then process the user input. The processing may involve branching logic embedded in the workflow. A complete page is typically associated with a single workflow, and the user interface on the page corresponds to the workflow instance.

SUMMARY

A workflow container defines boundaries within which a user interface appears on a page. The workflow container may change what is displayed on the user interface based on a current state of the workflow. The page may include multiple workflow containers. Each workflow container maintains an independent association with a workflow that drives the user interface. The workflow is associated with the workflow container at a control level such that multiple workflows may be independently executed on the same page concurrently or separately.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE DRAWINGS

FIG. 8 illustrates sample mark-up language software code showing an implementation of a control-scoped user interface workflow.

DETAILED DESCRIPTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on server and personal computer systems, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
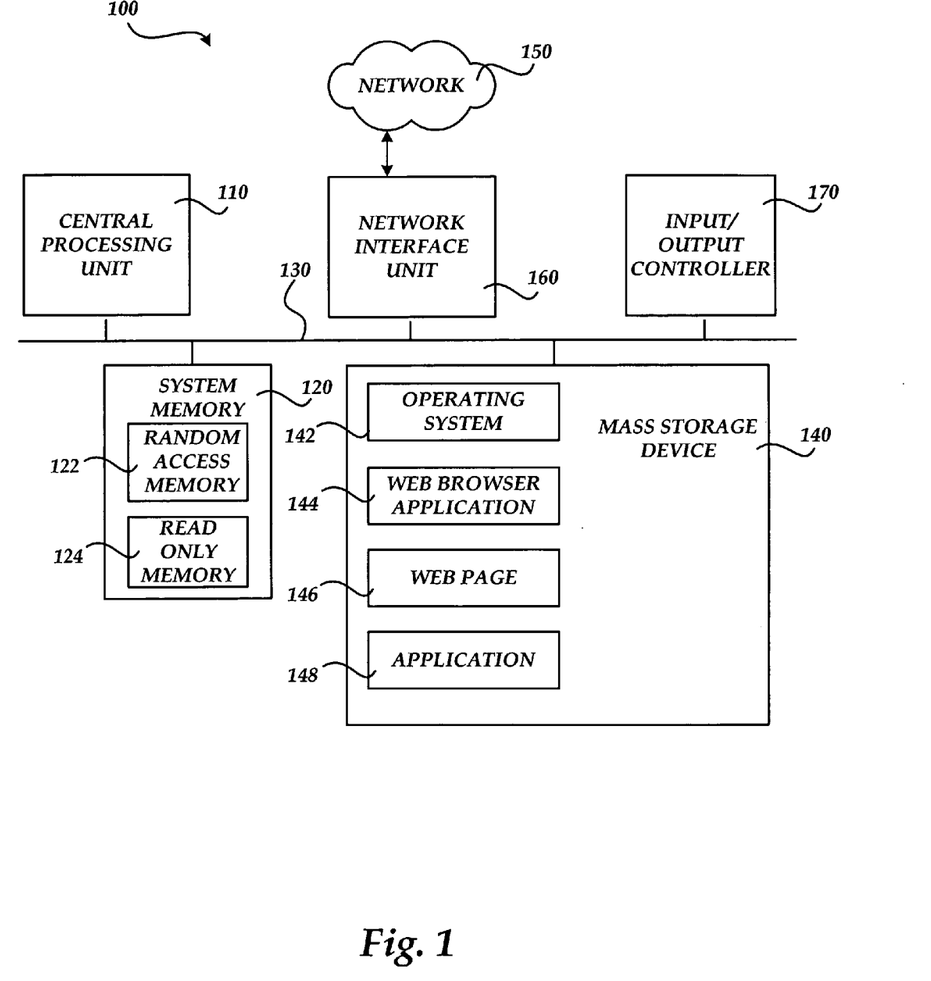
FIG. 1 is a computer system architecture diagram illustrating a computer system utilized in and provided by the various embodiments of the invention.

Referring now to FIG. 1, an illustrative computer architecture for a computer 100 utilized in the various embodiments of the invention will be described. The computer architecture shown in FIG. 1 illustrates a conventional desktop or laptop computer, including a central processing unit 110 ("CPU"), a system memory 120, including a random access memory ("RAM") 122 and a read-only memory ("ROM") 124, and a system bus 130 that couples the memory to the CPU 110. A basic input/output system containing the basic routines that help to transfer information between elements within the computer, such as during startup, is stored in the ROM 124. The computer 100 further includes a mass storage device 140 for storing an operating system 142, application programs, and other program modules, which will be described in greater detail below.

The mass storage device 140 is connected to the CPU 110 through a mass storage controller (not shown) connected to the bus 130. The mass storage device 140 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments of the invention, the computer 100 may operate in a networked environment using logical connections to remote computers through a network 150, such as the Internet. The computer 100 may connect to the network 150 through a network interface unit 160 connected to the bus 130. It should be appreciated that the network interface unit 160 may also be utilized to connect to other types of networks and remote computer systems. The computer 100 may also include an input/output controller 170 for receiving and processing input from a number of other devices, including a keyboard, mouse, or electronic stylus (not shown in FIG. 1). Similarly, the input/output controller 170 may provide output to a display screen, a printer, or other type of output device.

As mentioned briefly above, a number of program modules and data files may be stored in the mass storage device 140 and RAM 122 of the computer 100, including an application 148 and the operating system 142 that is suitable for controlling the operation of a networked personal computer, such as the WINDOWS XP operating system from MICROSOFT CORPORATION of Redmond, Wash. The mass storage device 140 and the RAM 122 may also store one or more program modules. In particular, the mass storage device 140 and the RAM 122 may store a web browser application program 144. As known to those skilled in the art, the web browser application program 144 is operative to request, receive, render, and provide interactivity with electronic documents, such as a web page 146 that has been formatted using HTML. According to one embodiment of the invention, the web browser application program 144 comprises the INTERNET EXPLORER web browser application program from MICROSOFT CORPORATION. It should be appreciated, however, that other web browser application programs from other manufacturers may be utilized to embody the various aspects of the present invention, such as the FIREFOX web browser application from the MOZILLA FOUNDATION.

Figure 2:
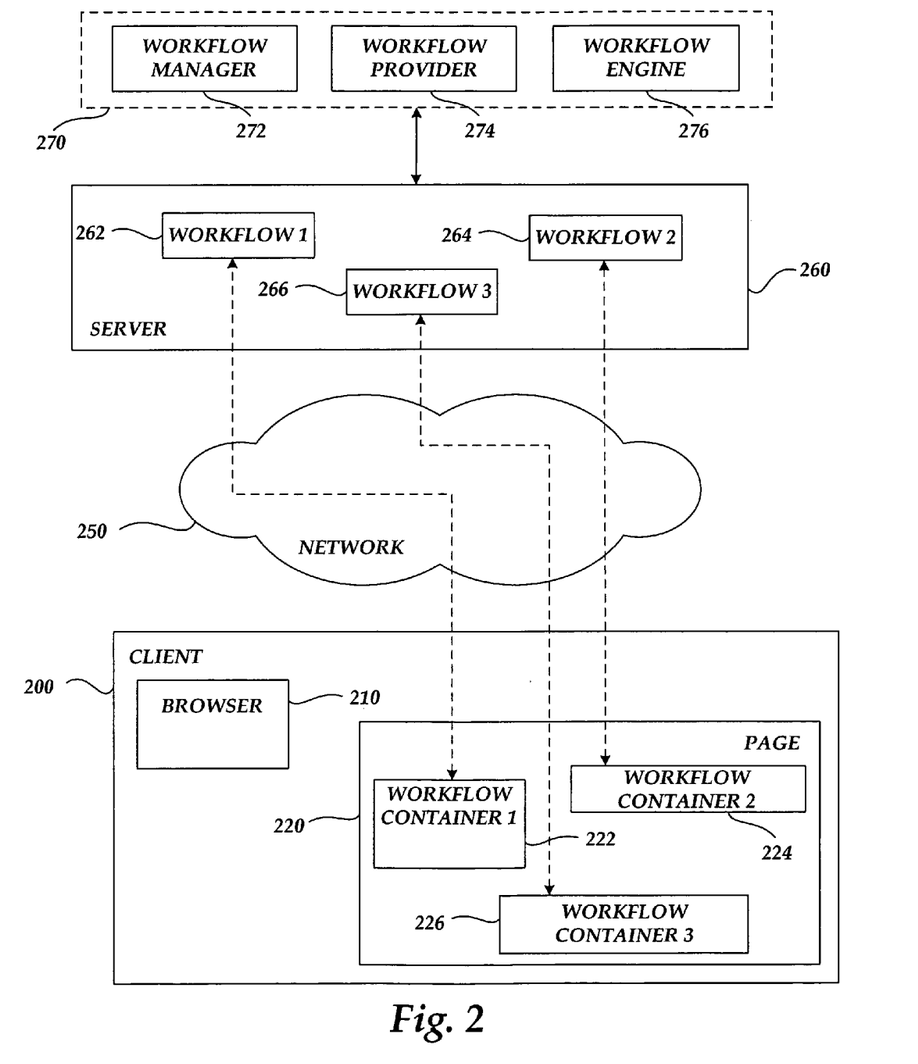
FIG. 2 is a functional block diagram illustrating a system for executing a control-scoped user interface workflow.

FIG. 2 is a functional block diagram illustrating a system for executing a control-scoped user interface workflow. The control-scoped user interface workflow is explained with reference to a client and a server coupled via a network. It should be appreciated that although the embodiments described herein are presented in the context of a client-server system, the invention may be utilized in desktop applications that do not make use of a server.

The system includes a client 200 coupled to a server 260 via a network 250. A workflow module 270 is coupled to the server 260. The client 200 includes a browser 210 and a page 220. The page 220 includes workflow containers 222, 224, 226. The workflow containers 222, 224, 226 are embodied as controls on the page 220. The workflow containers 222, 224, 226 define the boundaries of the user interface on the page 220. The server 260 includes workflows 262, 264, 266. Workflow container 222 is associated with workflow 262, workflow container 224 is associated with workflow 264, and workflow container 226 is associated with workflow 266. The workflows 262, 264, 266 are associated with the workflow containers 222, 224, 226 at a control level such that multiple workflows may be independently executed on the page 220. The workflows 262, 264, 266 may execute concurrently or separately based on user action.

Workflow module 270 includes workflow manager 272, workflow provider 274, and workflow engine 276. The workflow containers 222, 224, 226 interact with the workflow manager 272, the workflow provider 274 and the workflow engine 276 through the corresponding workflows 262, 264, 266.

The system is arranged such that multiple workflows may be presented within a single user interface. In one embodiment, the page 220 may be a portal page displayed to the user at the client 200. Each workflow container 222, 224, 226 is driven by the corresponding workflow 262, 264, 266. The workflows 262, 264, 266 may be executed simultaneously such that the page 220 can independently display information based on a current state of the different workflows 262, 264, 266. For example, the page 220 may be associated with a stock trading web site. Workflow 262 may correspond to a process for buying and selling stock, workflow 264 may correspond to a calculator process, and workflow 266 may correspond to a process for charting a comparison between simulated price trends and actual stock pricing. Thus, information from the different workflows 262, 264, 266 may be independently displayed in the corresponding workflow container 222, 224, 226.

As the workflow 262 executes, requested information is displayed in the workflow container 222. Thus, the information displayed in the workflow container 222 changes over time. Each version of the workflow container 222 is associated with a unique identifier to identify the corresponding workflow 262 that is associated with the information displayed in the workflow container 222. The workflow container 222 stores the unique identifier in a control state. As post backs to the server 260 are performed, the unique identifier is used to identify the workflow 262 that corresponds to the workflow container 222. The current view of the workflow container 222 is also stored in a control state of the workflow container 222. The current view of the workflow container 222 is associated with an activity in the workflow. When a post back to the server 260 occurs, the current view is used to identify a current state of the workflow, as discussed in detail below.

Figure 3:
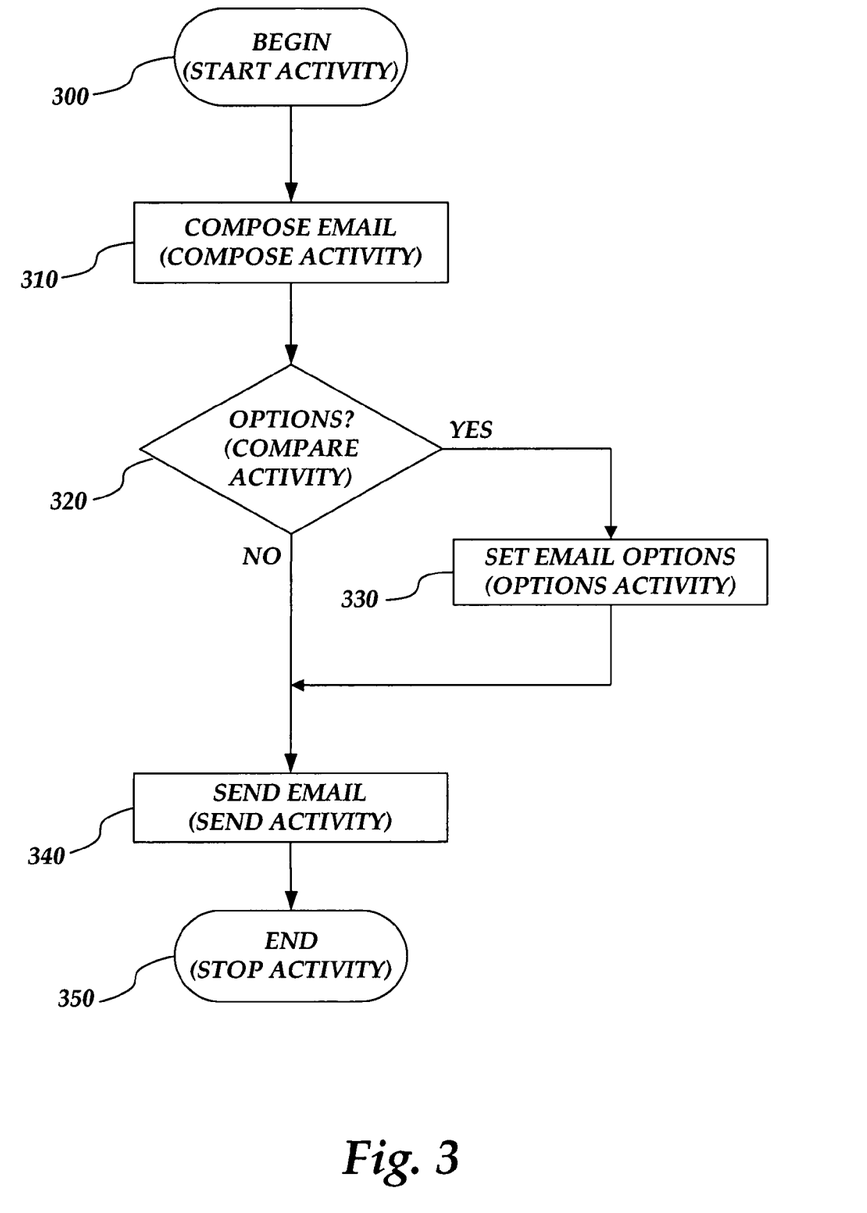
FIG. 3 is an operational flow diagram illustrating an example workflow that is used to describe the execution of a control-scoped user interface workflow.

FIG. 3 is an operational flow diagram illustrating an example workflow that is used to describe the execution of a control-scoped user interface workflow. The operation is described with reference to an email application. However, any application workflow that includes a sequence of steps to execute an action may be used.

A user may initiate the email application by activating a new message function at block 300. The workflow executes a start activity. Continuing to block 310, the user composes the email in accordance with a compose activity in the workflow. The user interface displays textboxes corresponding to data fields for receiving user input. For example, the text boxes may correspond to "to", "subject" and "body". The user enters appropriate data in the data fields to compose the email message.

Moving to decision block 320, a determination is made whether the user has selected email options in accordance with a compare activity in the workflow. The user may select email options by checking a box on the user interface. If the user did not select email options, processing continues to block 340. If the user selected email options, processing advances to block 330 where the user sets the desired email options in accordance with an options activity in the workflow.

Processing then continues at block 340 where the email is sent in accordance with a send activity in the workflow. The workflow terminates at termination block 350 in accordance with a stop activity in the workflow. Details regarding workflow processing of the email application are provided with reference to FIGS. 4-6.

Figure 4:
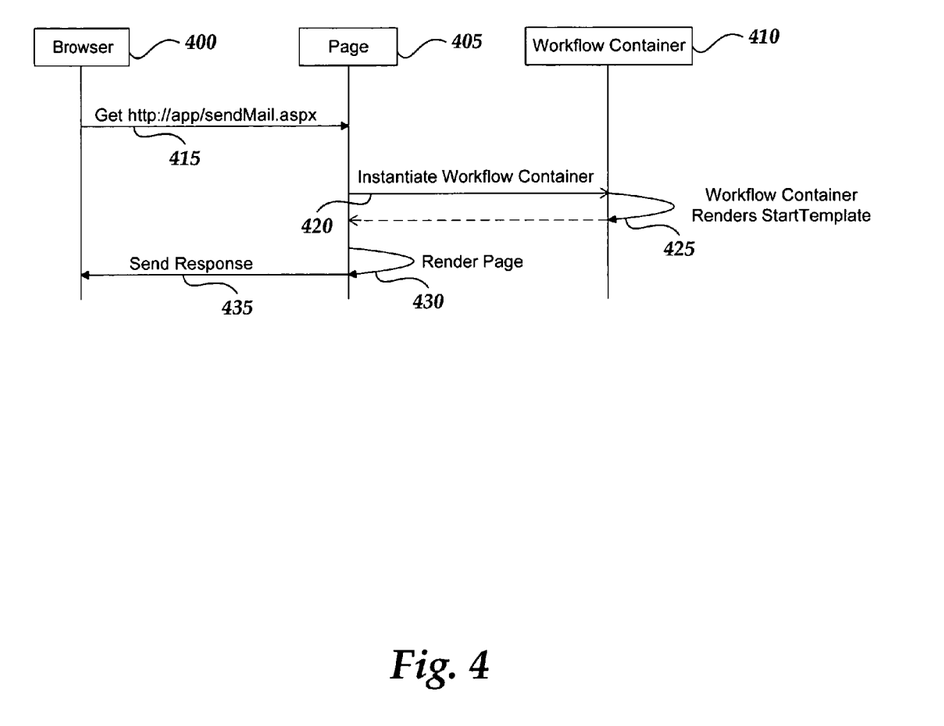
FIG. 4 is an operational state diagram illustrating the execution of a control-scoped user interface workflow.

FIG. 4 is an operational state diagram illustrating the execution of a control-scoped user interface workflow. The operation is described with reference to an email application. However, any application workflow that includes a sequence of steps to execute an action may be used.

The state diagram is described with reference to a browser 400, a page 405, and a workflow container 410. A user may initiate an email application workflow by submitting a request to send an email message. The request may be submitted by clicking a button displayed on a user interface at a client. At step 415, the browser 400 submits the request to a server to retrieve the page 405 associated with the request. For example, the browser 400 may identify the page 405 to be retrieved using a URL (e.g., sendMail.aspx). The page 405 includes the workflow container 410 that has not yet been instantiated. The workflow container 410 operates as a control on the page 405.

The workflow container 410 is instantiated at step 420. The workflow container 410 renders a template called StartTemplate at step 425 because a workflow instance has not been previously instantiated. StartTemplate is a definition in the workflow container 410 that identifies an initial state to display on the user interface. For example, the StartTemplate may define a button (e.g., SendMail) for display on the user interface that a user can click to initiate a process for sending an email message. A page corresponding to the initial state is rendered at step 430. A response is sent from the page 405 to the browser 400 at step 435 such that the page is forwarded to the client for display to the user. The browser 400 then waits for user input to initiate a process for sending an email message.

Figure 5:
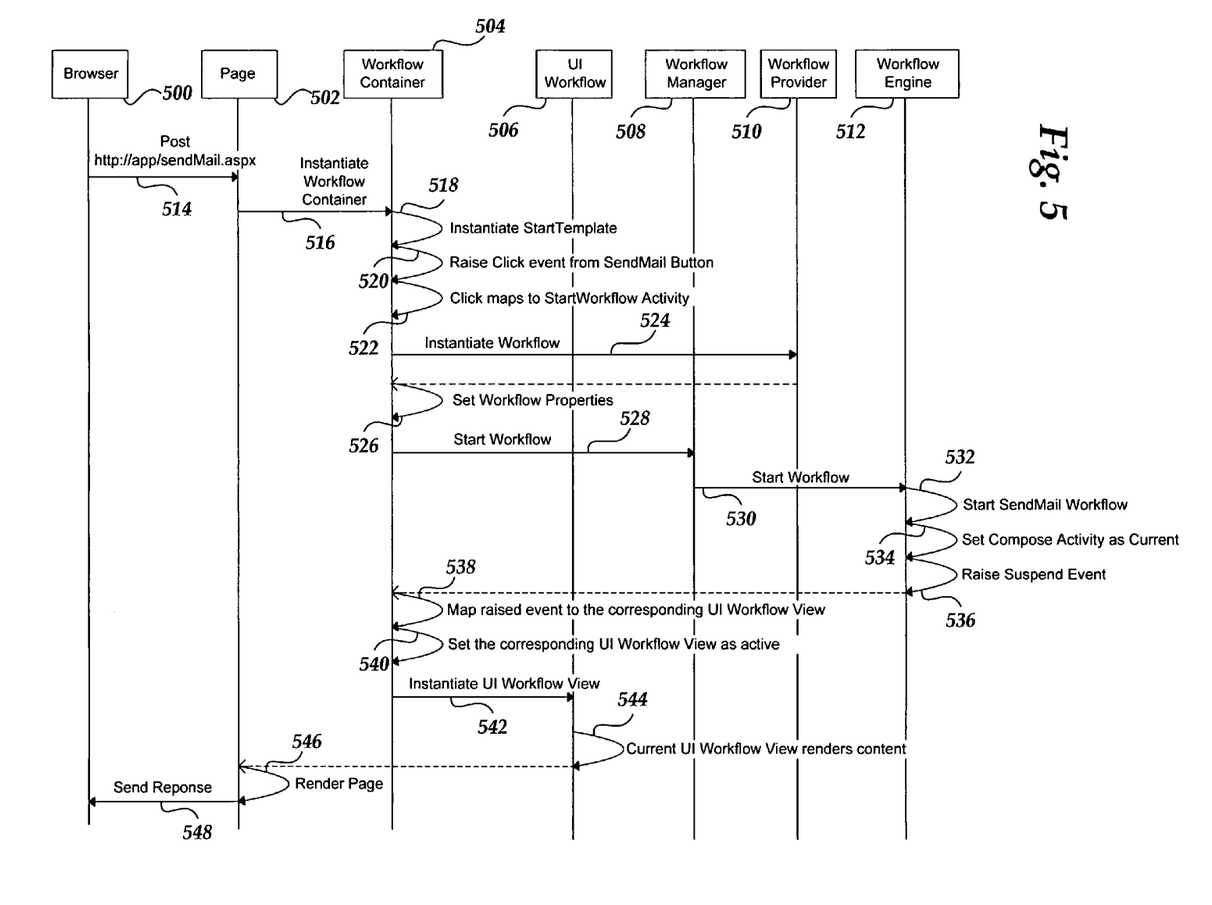
FIG. 5 is an operational state diagram illustrating the execution of a control-scoped user interface workflow.

FIG. 5 is an operational state diagram illustrating the execution of a control-scoped user interface workflow. The state diagram is described with reference to a browser 500, a page 502, a workflow container 504, a user interface workflow 506, a workflow manager 508, a workflow provider 510 and a workflow engine 512.

A user may initiate a process for sending an email message by clicking a SendMail button displayed on a user interface at a client. At step 514, a post back to the server communicates that an email message is to be sent. The browser 500 submits the request to send the email message to a server to retrieve the page 502 associated with the request (e.g., sendMail.aspx). The page 502 includes the workflow container 504. The workflow container is instantiated at step 516. As discussed above with reference to FIG. 4, the current state of the workflow container 504 includes the StartTemplate. At step 518, the workflow container 504 instantiates the StartTemplate. The workflow container 504 processes the click event raised by the SendMail button at step 520. The click event maps to a StartWorkflow action at step 522.

At step 524, the workflow provider 510 instantiates the workflow. Properties associated with the instantiated workflow are set by the workflow container 504 at step 526. At step 528, execution of the workflow is initiated by contacting the workflow manager 508. The workflow manager 508 communicates with the workflow engine 512 to begin execution of the workflow at step 530. The workflow engine 512 starts the SendMail workflow at step 532. At step 534, the workflow engine 512 begins execution of the workflow by setting the ComposeActivity as the current state of the user interface. The ComposeActivity requires user input at the user interface. The workflow engine 512 suspends the SendMail workflow at step 536 by raising a suspend event until user input is received.

At step 538, the raised event (i.e., suspend SendMail workflow) maps to a corresponding user interface view in the workflow container 504 using a unique identifier. The corresponding user interface view is activated and identified as the current view in the workflow container 504 at step 540. The user interface view is then instantiated at step 542. At step 544, the content of the current user interface view is rendered. The page 502 is then rendered with the current user interface view at step 546. A response is sent from the page 502 to the browser 500 at step 548 such that the page 502 is passed to the client for display to the user. The browser 500 then waits for user input.

In the SendMail workflow example, the browser 500 may display textboxes for "to", "subject", and "body of message". The user may then enter content in data fields corresponding to the textboxes. When the user clicks a Submit button, the suspend event is lifted such that the content entered by the user is posted back to the server.

Figure 6:
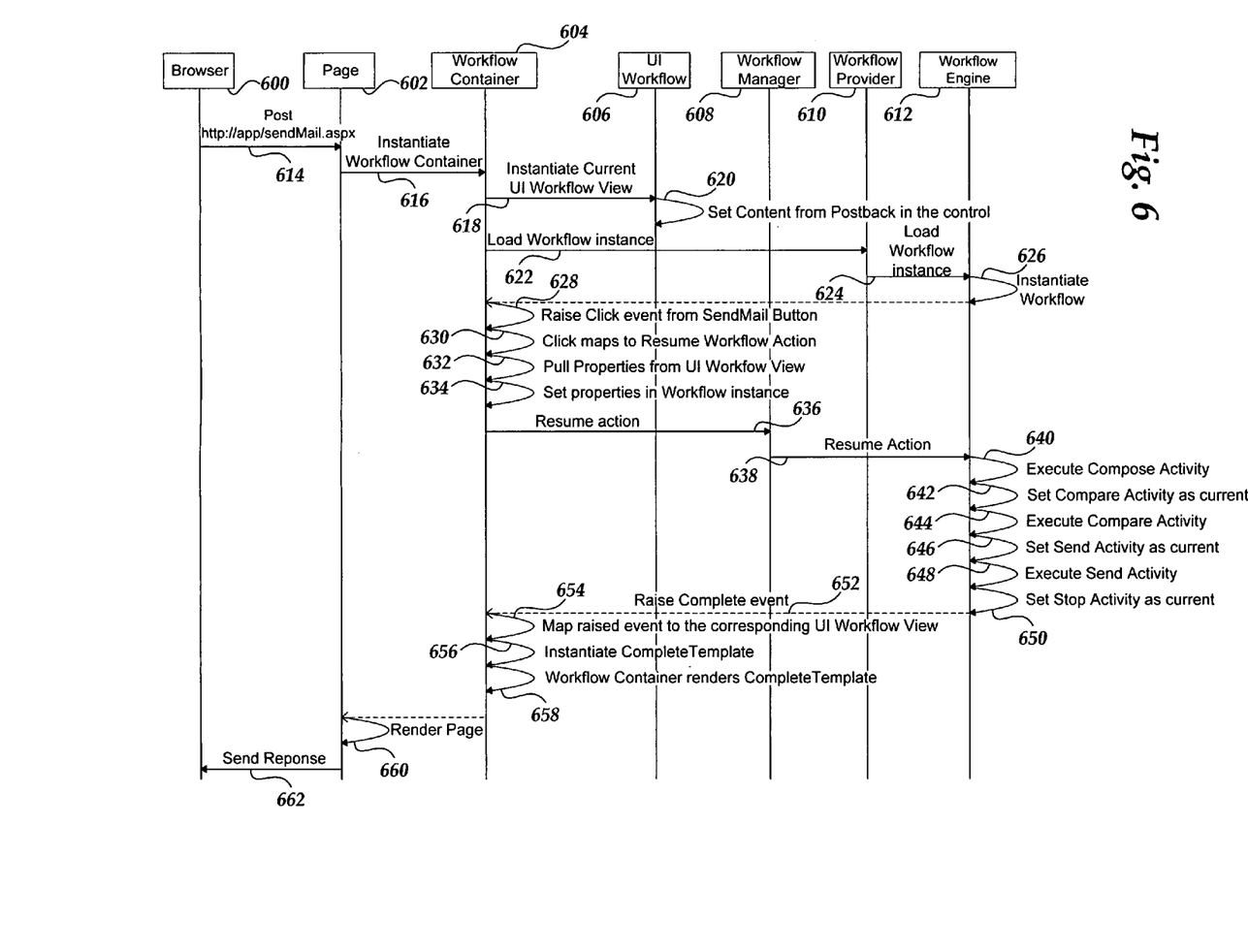
FIG. 6 is an operational state diagram illustrating the execution of a control-scoped user interface workflow.

FIG. 6 is an operational state diagram illustrating the execution of a control-scoped user interface workflow. The state diagram is described with reference to a browser 600, a page 602, a workflow container 604, a user interface workflow 606, a workflow manager 608, a workflow provider 610 and a workflow engine 612.

At step 614, content entered by the user (e.g., after clicking the Submit button) is posted back to the server by forwarding the page 602 to the server. The page 602 instantiates the workflow container 604 at step 616. The workflow container 604 is no longer associated with the StartTemplate view. The current user interface view is instantiated at step 618. The current user interface view maps to the most recent view that was sent to the client. At step 620, the content from the post back is applied to elements and controls in the current user interface view.

At step 622, the workflow container loads the workflow instance such that workflow data is passed to the workflow provider 610. The workflow container 604 identifies the current workflow instance using an identifier associated with the current workflow instance. The workflow provider 610 passes the workflow data to the workflow engine 612 at step 624. The workflow engine 612 instantiates the workflow at step 626 using the workflow data. The workflow engine 612 determines from the instantiated workflow that the workflow is waiting for user input at the user interface.

At step 628, the SendMail button receives post back information based on the instantiated workflow such that a click event is raised on the server. The click event maps to a resume workflow action at step 630. The workflow container 604 responds to the resume workflow action in step 632 by pulling properties from the user interface workflow view that is relevant to the workflow (e.g., the email message data fields). The properties are set in the workflow instance at step 634 such that the workflow includes the data entered by the user.

At step 636, the workflow container 604 passes the workflow to the workflow manager 608. The workflow manager 608 forwards the workflow to the workflow engine 612 at step 638 so that workflow execution resumes. The workflow engine 612 executes a compose activity at step 640. A compare activity is set as the current state of the user interface at step 642 and executed at step 644 to determine whether additional options are selected. In this case, no additional options are selected. At step 646, a send activity is set as the current state of the user interface. The send activity is executed at step 648 such that the email message is sent. A stop activity is set as the current state of the user interface at step 650 after the email message is sent. The workflow engine 612 informs the workflow container 604 that the workflow is complete by raising a complete event at step 652.

At step 654, the raised event maps to a corresponding user interface workflow view in the workflow container 604 using a unique identifier. A CompleteTemplate is instantiated at step 656. The CompleteTemplate indicates that the email message has been sent. The workflow container 604 renders the CompleteTemplate at step 658. The page 506 is rendered with the current user interface workflow view at step 660. A response is sent from the page 602 to the browser 600 at step 662 such that the page 602 is passed to the client for display to the user. The browser 600 then waits until another workflow is activated on the page 602 by the user (e.g., click SendMail button).

Figure 7:
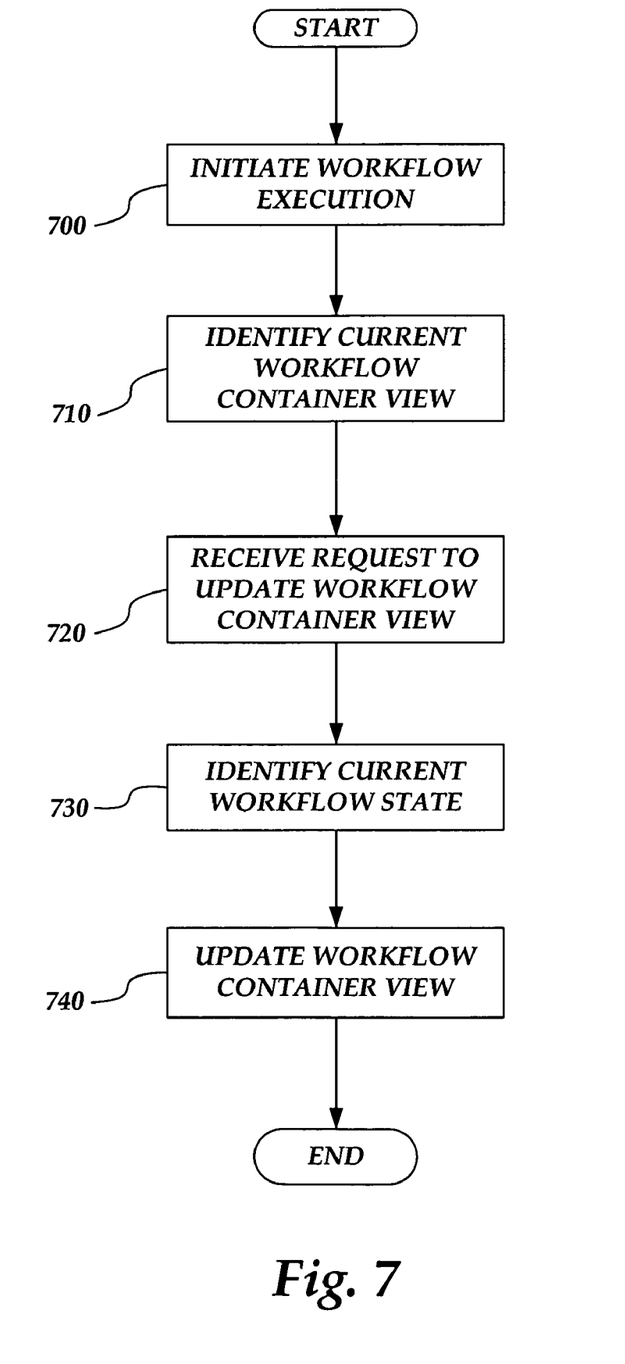
FIG. 7 is an operational flow diagram illustrating a process for executing a control-scoped user interface workflow.

FIG. 7 is an operational flow diagram illustrating a process for executing a control-scoped user interface workflow. The process begins at a start block where at least one workflow container is defined as a control on a user interface. The workflow container defines the boundaries of the control on the user interface. The workflow container is associated with a workflow that drives the control. The workflow container is associated with the workflow based on the workflow type. The workflow container view may change as the workflow executes.

Processing continues at block 700 where execution of the workflow is initiated. Workflow execution may be initiated by user input. For example, the user may click a button control on the user interface to initiate execution of the workflow.

Proceeding to block 710, the current workflow container view is identified. Each workflow container view is associated with a corresponding activity in the workflow. The current workflow container view is the workflow container view that is associated with a current state of the workflow. For example, the current workflow container view may be associated with the activity that displays the button control on the user interface that the user clicked.

Moving to block 720, a request is received to update the workflow container view. The request may be initiated by the workflow to change what is displayed in the current workflow container view. For example, the workflow may require user input. Thus, the request corresponds to a prompt for user input.

Transitioning to block 730, the current state of the workflow is identified. Each activity in the workflow is identified by a unique identifier and a corresponding workflow container view. The unique identifier is stored in the workflow container. The current state of the workflow is identified by accessing the unique identifier in the workflow container that is associated with the workflow activity.

Continuing to block 740, the workflow container view is updated in accordance with the current state of the workflow. The workflow container view is identified using the unique identifier associated with the activity of the current state of the workflow. The workflow container view may be updated by displaying text boxes to prompt the user for input and data fields to receive the user input. Processing then terminates at an end block.

FIG. 8 illustrates sample mark-up language software code showing an implementation of a control-scoped user interface workflow. The workflow corresponds to a sequence for composing an email message. The code includes a tag 800 (identified as 'runat="server"'). Each tag 800 represents a server control. A user interface workflow container ("UIFlowContainer") defines boundaries within which a user interface appears on a page. A string property called "WorkflowTypeName" 810 is used to identify the workflow type. The workflow type may be identified as "SendMailWorkflow" 820. The string property is mapped to the workflow type such that the workflow container is associated with a particular workflow. Views 830 represent the different locations in the workflow process that require user input, or that require the application to display information on the user interface. One level down from views 830, activities are defined (e.g., Compose and Options). Each activity is associated with a unique identifier 840.

Based on the foregoing, it should be appreciated that the various embodiments of the invention include a method, system, apparatus, and computer-readable medium for executing a control-scoped user interface workflow. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for executing a control-scoped user interface workflow, the computer-implemented method comprising:

receiving a request for a webpage on a browser application of a client device;

in response to the request, displaying on the browser application of the client device the requested webpage, wherein the requested webpage includes a plurality of workflow containers implemented as controls of the requested webpage, wherein each of the plurality of workflow containers define respective independent display boundaries within the webpage for a respective corresponding workflow located on a server, wherein each of the workflow containers include an identifier that indicates the respective corresponding workflow and each of the workflow containers includes a current view that identifies the current state of the workflow container;

executing a respective initial template of each of the plurality of workflow containers to independently cause execution of a workflow display within each of the respective workflow containers defined within the respective independent display boundaries of each of the workflow containers;

in response to receiving a request in any one of the plurality of the independently executed workflow containers of the webpage, identifying a respective corresponding workflow located on the server via the identifier of the workflow container receiving the request, identifying a current state of the workflow container via the current view of the workflow container receiving the request, and receiving, in the workflow container receiving the request, updated information from the corresponding respective workflow located on the server to provide independent execution of the corresponding respective workflow that is independent from execution of any of the other workflow containers of the plurality of workflow containers of the webpage.

2. The computer-implemented method of claim 1, wherein the plurality of workflow containers are implemented as controls within the webpage, wherein respective workflows, located on the server, drive the display of respective workflow containers in response to a user input.

3. The computer-implemented method of claim 1, wherein respective workflows on the server are executed, via respective workflow containers separately.

4. The computer-implemented method of claim 1, wherein respective workflows on the server are executed, via respective workflow containers concurrently.

5. The computer-implemented method of claim 1, wherein a respective initial template is stored in a respective workflow container of the plurality of workflow containers of the webpage.

6. The computer-implemented method of claim 1, wherein the respective corresponding workflow is executed on the server.

7. The computer-implemented method of claim 1, wherein a mark-up language document provides the respective independent display boundaries for each of the plurality of work flow containers of the webpage.

8. The computer-implemented method of claim 7, wherein the mark-up language document includes properties to map each of the workflow containers to corresponding respective workflows of the server.

9. A computer-readable storage medium having computer executable instructions for executing a control-scoped user interface workflow, the instructions comprising:
receiving a request for a webpage on a browser application of a client device;
in response to the request, displaying on the browser application of the client device the requested webpage, wherein the requested webpage includes a plurality of workflow containers implemented as controls of the requested webpage, wherein each of the plurality of workflow containers define respective independent display boundaries within the webpage for a respective corresponding workflow located on a server, wherein each of the workflow containers include an identifier that indicates the respective corresponding workflow and each of the workflow containers includes a current view that identifies the current state of the workflow container;
executing a respective initial template of each of the plurality of workflow containers to independently cause execution of a workflow display within each of the respective workflow containers defined within the respective independent display boundaries of each of the workflow containers;
in response to receiving a request in any one of the plurality of the independently executed workflow containers of the webpage,
identifying a respective corresponding workflow located on the server via the identifier of the workflow container receiving the request,
identifying a current state of the workflow container via the current view of the workflow container receiving the request, and
receiving, in the workflow container receiving the request, updated information from the corresponding respective workflow located on the server to provide independent execution of the corresponding respective workflow that is independent from execution of any of the other workflow containers of the plurality of workflow containers of the webpage.

10. The computer-readable storage medium of claim 9, wherein the plurality of workflow containers are implemented as controls within the webpage, wherein respective workflows, located on the server, drive the display of respective workflow containers in response to a user input.

11. The computer-readable storage medium of claim 9, wherein respective workflows on the server are executed, via respective workflow containers separately.

12. The computer-readable storage medium of claim 9, wherein respective workflows on the server are executed, via respective workflow containers concurrently.

13. The computer-readable storage medium of claim 9, wherein a respective initial template is stored in a respective workflow container of the plurality of workflow containers of the webpage.

14. The computer-readable storage medium of claim 9, wherein the respective corresponding workflow is executed on the server.

15. The computer-readable storage medium of claim 9, wherein a mark-up language document provides the respective independent display boundaries for each of the plurality of work flow containers of the webpage.

16. The computer-readable storage medium of claim 15, wherein the mark-up language document includes properties to map each of the workflow containers to corresponding respective workflows of the server.

17. A system for executing a control-scoped user interface workflow, the instructions comprising:
a processor; and
a memory having computer executable instructions stored thereon, wherein the computer executable instructions are configured for:
receiving a request for a webpage on a browser application of a client device;
in response to the request, displaying on the browser application of the client device the requested webpage, wherein the requested webpage includes a plurality of workflow containers implemented as controls of the requested webpage, wherein each of the plurality of workflow containers define respective independent display boundaries within the webpage for a respective corresponding workflow located on a server, wherein each of the workflow containers include an identifier that indicates the respective corresponding workflow and each of the workflow containers includes a current view that identifies the current state of the workflow container;
executing a respective initial template of each of the plurality of workflow containers to independently cause execution of a workflow display within each of the respective workflow containers defined within the respective independent display boundaries of each of the workflow containers;
in response to receiving a request in any one of the plurality of the independently executed workflow containers of the webpage,
identifying a respective corresponding workflow located on the server via the identifier of the workflow container receiving the request,
identifying a current state of the workflow container via the current view of the workflow container receiving the request, and
receiving, in the workflow container receiving the request, updated information from the corresponding respective workflow located on the server to provide independent execution of the corresponding respective workflow that is independent from execution of any of the other workflow containers of the plurality of workflow containers of the webpage.

18. The system of claim 17, wherein the plurality of workflow containers are implemented as controls within the webpage, wherein respective workflows, located on the server, drive the display of respective workflow containers in response to a user input.

19. The system of claim 17, wherein respective workflows on the server are executed, via respective workflow containers separately.

20. The system of claim 17, wherein respective workflows on the server are executed, via respective workflow containers concurrently.

* * * * *